Patented Dec. 11, 1934

1,984,260

UNITED STATES PATENT OFFICE 1,984,260

PROCESS FOR PREPARING LIQUIDS CONTAINING ACTIVE PRINCIPLES OR HORMONES FROM PARATHYROID GLANDS

Norman Evers and Cyril Jack Eastland, London, and James Henry Thompson, Whitton Park, England, assignors to Allen & Hanburys Limited, London, England No Drawing. Application November 3, 1931, Serial No. 572,878. In Great Britain November 10, 1930

17 Claims. (Cl. 167—74)

This invention concerns a process for preparing from parathyroid glands, liquids containing active principles or hormones which among other properties possess those of retarding or inhibiting the growth of tissues.

It has already been proposed to prepare from parathyroid glands an extract containing an active principle or hormone which has the effect, when injected, of increasing the calcium content of the blood above the normal or in other words of producing what is known as hypercalcaemia. The method for the preparation of this extract is described in the Journal of Biological Chemistry 1925 vol. 66, page 135.

We have found that it is possible to obtain from parathyroid glands, liquids containing active principles or homones which have the property of retarding or inhibiting the growth of tissues but when injected do not produce hypercalcaemia.

According to the invention the process for preparing from parathyroid glands a liquid containing an active principle or hormone or a mixture of active principles or hormones broadly comprises the steps of neutralizing an acid-containing extract of the parathyroid glands to a pH value of between about 4.6 and 5.0; filtering off the insoluble matters thrown down; and subjecting the filtrate to further treatment to concentrate and/or to purify the active principle or hormone or mixture of active principles or hormones contained therein.

An embodiment of the process of this invention comprises the steps of subjecting the parathyroid glands to extraction with an acid-containing liquid; separating the liquid extract from the insoluble matters; neutralizing the acid in the liquid extract and preferably to a pH value of between 4.6 and 5.0; allowing the mixture to stand in the cold until no further insoluble matters are thrown down; filtering the insoluble matters separated during the standing; concentrating the filtrate under reduced pressure; adjusting the pH value, if necessary, to between 4.6 and 5.0; allowing the liquid to stand until no further insoluble matters separate out and separating the liquid.

The resulting liquid contains the desired active principle or hormone or mixture of active principles or hormones and may be employed in this form or after working up for administration such as by injection.

The residue of glands may, if desired, be subjected to re-extraction with the acid-containing liquid and the liquid extract may either be added to the main bulk which is to undergo the neutralizing treatment or may be neutralized separately, the filtrate being added to the main bulk of the filtrate which is to undergo concentration. If desired more than one re-extraction with the acid-containing liquid may be performed.

To obtain the most satisfactory results the neutralization of the acid in the extract should be carried out so that the extract has a pH value=4.8 which figure appears to be the most satisfactory value at which undesirable insoluble matters will separate out.

The parathyroid glands are preferably employed in a comminuted condition such as that obtained by mincing the frozen glands.

The acid-containing liquid may consist of water, an alcohol, for instance ethyl alcohol, or a ketone, for instance acetone, and an acid such as sulphuric acid. We have ascertained that a mixture of ninety parts by volume of thirty percent alcohol and ten parts by volume of sulphuric acid when used for the extraction results in a liquid having high activity.

The acid-containing liquid may also consist of dilute aqueous acid such as dilute sulphuric acid or dilute hydrochloric acid. The acid-containing liquid extract may be prepared under the influence of heat, any fat separating from the extract on cooling being removed prior to the neutralization.

The extraction under heat must not be so drastic that all the proteins are hydrolyzed to amino-acids. It should be so conducted that only a very small amount of amino-acids are present in the end-product.

If desired, the fat separating out may be extracted again with the acid-containing liquid and again subjected to cooling, the extract being added to the main bulk of extract. Alternatively the fat may be dissolved in a solvent and the solution extracted with an acid-containing liquid, the fat solution being separated and the acid-containing liquid being added to the main bulk of extract as before.

The glands may be extracted with a fat solvent such as acetone, benzene or toluene prior to the extraction with the acid-containing liquid. If desired, the extraction with the acid-containing liquid may be combined with a treatment with a fat solvent and for this purpose the glands are agitated with a mixture of the acid-containing liquid and the solvent such as acetone, benzene or toluene is then separated from the acid-containing liquid.

If desired the insoluble matters which separate out from the first standing may be re-dissolved in dilute alkali solution to a pH value=8.0 to 9.0, then brought back to pH value between 4.6 and 5.0 with dilute acid and after standing the insoluble matters may again be separated and the liquid may be added to the main portion which is to be concentrated.

The residue of parathyroid glands remaining after the extraction with the acid-containing liquid may be treated with dilute alkali and the alkaline solution obtained therefrom may either be neutralized to a pH value of between 4.6 and 5.0 or employed for neutralizing the acid in a previously obtained extract. If the pH value is adjusted to between 4.6 and 5.0 the insoluble matters which separate are removed as by filtration and the liquid is added to the main portion which is to be concentrated.

The following examples serve to illustrate how the process of preparation of this invention may be carried into effect:—

1. 1 lb. of frozen parathyroid glands are minced. 300 c. c. of sulphuric acid are mixed with 1800 c. c. of water and cooled. 900 c. c. of industrial alcohol are added and the mixture added to the glands. 700 c. c. of benzene are then added and the whole is shaken for 48 hours. The gland material is strained off, and the benzene separated. The acid-alcoholic liquid is neutralized by the gradual addition of strong sodium hydroxide solution, keeping cool, until the pH value is 4.8. Industrial alcohol is then added until the concentration of alcohol is 75 per cent in order to throw down the sodium sulphate.

After standing in the cold the sodium sulphate and other insoluble matters thrown down are filtered off and the filtrate is concentrated under reduced pressure until the volume is such that 1 c. c. is equivalent to 2 grammes of parathyroid gland. The liquid is then cooled, the pH value being adjusted, if necessary, to 4.8. After the addition of 0.3 per cent of cresol as a preservative, the liquid is allowed to stand until it no longer throws down insoluble matters. The liquid is finally filtered through a bacteria-proof filter and is then ready for injection.

2. Macerate 100 grammes of thoroughly minced parathyroid glands for 48 hours with continuous shaking with one litre of a liquid containing 35 per cent by volume of alcohol and 5 per cent by volume of concentrated sulphuric acid. At the end of this period neutralize the liquid with sodium hydroxide solution of not less than 40 per cent strength until the liquid is slightly acid to litmus. Cool and allow to stand overnight in a cold place. Filter, distil off the alcohol, concentrating to about 50 c. c. Cool, adjust the pH value to about 4.8, add 0.3% of cresol and allow to stand overnight in a cold place. Filter. The filtrate contains the desired active principle.

3. Heat 100 grammes of thoroughly minced parathyroid glands on a boiling water-bath with 100 c. c. of dilute sulphuric acid containing 5 per cent of the concentrated acid for 45 minutes. Cool, separate the fat and adjust the reaction of the solution to pH=9 by the addition of sodium hydroxide solution. Strain through muslin, press the residue and centrifuge the turbid liquid. Separate the supernatant liquid and adjust the reaction of the solution to pH=4.8 by the addition of dilute sulphuric acid and, after allowing to stand for a few hours in the cold, centrifuge (Solution A). Re-dissolve the separated precipitate in 15 c. c. of dilute alkali at pH=9, again adjust the reaction of the solution to pH=4.8, allow to stand for a few hours in the cold, centrifuge and add the solution to solution A. Add sufficient industrial alcohol to precipitate sodium sulphate and allow the mixture to stand overnight. Filter off the sodium sulphate and other insoluble matters and concentrate under reduced pressure to 50 c. c. Adjust the pH value, if necessary, to 4.8. Add 0.3 per cent of cresol and allow to stand overnight in a cold place. Filter. The filtrate contains the desired active principle.

4. Macerate 100 grammes of thoroughly minced parathyroid glands with about one litre of acetone for 48 hours. Filter and again macerate with 500 c. c. of acetone for 24 hours. Dry the residue in a current of air and finally in a vacuum desiccator over calcium chloride. Grind to a moderately fine powder. Heat on a boiling water-bath for 45 minutes with 100 c. c. of dilute sulphuric acid containing 5 per cent of the concentrated acid. Strain, adjust the reaction of the solution to pH=8 by addition of sodium hydroxide solution and filter (Solution B).

Macerate the residue in 100 c. c. of dilute alkali at about pH=9 for half an hour and strain (Solution C). Combine the solutions B and C, adjust the reaction of the mixture to pH=4.8 by the addition of dilute sulphuric acid, and after allowing to stand for a few hours, centrifuge, separate the solution and re-dissolve the precipitate in 15 c. c. of dilute alkali at pH=9, again adjust the reaction of the solution to pH=4.8, allow to stand for a few hours, centrifuge and add the solution to the first solution. Add sufficient industrial alcohol to precipitate the sodium sulphate and allow the mixture to stand overnight. Filter off the sodium sulphate and insoluble matters and concentrate under reduced pressure to 50 c. c. Adjust the pH value, if necessary, to 4.8, add 0.3 per cent of cresol and allow to stand overnight in a cold place. Filter. The filtrate contains the desired active principle.

What we claim is:—

1. A process for preparing from parathyroid glands a liquid containing at least one active principle or hormone which comprises the steps of neutralizing an acid-containing extract of the parathyroid glands to a pH value of between about 4.6 and 5.0; filtering off the insoluble matters thrown down and subjecting the filtrate to concentration and if necessary to purification.

2. A process for preparing from parathyroid glands a liquid containing at least one active principle or hormone which comprises the steps of subjecting the glands to extraction with an acid-containing liquid; separating the liquid extract from the insoluble matters; neutralizing the acid in the liquid extract; allowing the mixture to stand in the cold until no further insoluble matters are thrown down; filtering the insoluble matters separating during the standing; concentrating the filtrate; adjusting the pH value to between about 4.6 and 5.0, preferably 4.8, allowing the mixture to stand until no further insoluble matters separate out; and separating the liquid.

3. A process for preparing from parathyroid glands a liquid containing at least one active principle or hormone which comprises the steps of subjecting the glands to extraction with an acid-containing liquid; separating the liquid extract from the insoluble matters; neutralizing the acid in the liquid extract to a pH value of between 4.6 and 5.0, preferably 4.8; allowing the mixture to stand in the cold until no further insoluble matters are thrown down; filtering the insoluble matters separating during the standing; concentrating the filtrate; adjusting the pH value to between about 4.6 and 5.0, preferably 4.8, allowing the mixture to stand until no further insoluble matters separate out; and separating the liquid.

4. A process as claimed in claim 3 comprising the steps of re-extracting the residue of parathyroid glands with the acid-containing liquid and utilizing the extract in the process of preparation.

5. A process as claimed in claim 3 comprising the step of extracting the glands with a fat solvent prior to treatment with the acid-containing liquid.

6. A process for preparing from parathyroid glands a liquid containing at least one active principle or hormone which comprises the steps of subjecting the glands to extraction with a mixture of an acid-containing liquid and a fat solvent; straining the insoluble material off; separating the fat solvent from the acid-containing liquid; neutralizing the acid in the liquid extract to a pH value of between 4.6 and 5.0, preferably 4.8; allowing the mixture to stand in the cold until no further insoluble matters are thrown down; filtering the insoluble matters separating during the standing; concentrating the filtrate; adjusting the pH value to between about 4.6 and 5.0, preferably 4.8, allowing the mixture to stand until no further insoluble matters separate out; and separating the liquid.

7. A process as claimed in claim 3 wherein the acid-containing liquid comprises water, an organic solvent of the desired active principle and an acid.

8. A process as claimed in claim 3, wherein the acid-containing liquid comprises water, an alcohol and an acid.

9. A process as claimed in claim 3 wherein the acid-containing liquid consists of water, alcohol and sulphuric acid.

10. A process as claimed in claim 3 wherein the acid-containing liquid consists of ninety parts by volume of thirty per cent alcohol and ten parts by volume of sulphuric acid.

11. A process as claimed in claim 3 wherein the liquid extract is prepared under the influence of applied heat.

12. A process for preparing from parathyroid glands a liquid containing at least one active principle or hormone which comprises the steps of subjecting the glands to extraction with an acid-containing liquid; adjusting the reaction of the liquid with dilute alkali to a pH value 8.0–9.0; separating the insoluble matters; adjusting the reaction of the liquid with dilute acid to a pH value 4.6–5.0, preferably 4.8; allowing the mixture to stand in the cold until no further insoluble matters are thrown down and separating the liquid.

13. A process as claimed in claim 3 which comprises the steps of re-dissolving the insoluble matters separating out in the cold in dilute alkali solution to a pH value 8.0–9.0; adjusting the pH value to between 4.6–5.0 with dilute acid; separating the insoluble matters and adding the liquid to the main portion of the liquid extract for the further treatment.

14. A process as claimed in claim 3 which comprises the steps of treating the residue of parathyroid glands after the extraction with the acid-containing liquid with dilute alkali; filtering and adjusting the pH value of the filtrate to a pH value 4.6–5.0 with dilute acid; allowing the mixture to stand; separating the insoluble matters and adding the liquid to the main portion to be concentrated.

15. A process as claimed in claim 3 comprising the steps of extracting the glands with a fat solvent prior to treatment with the acid-containing liquid, subjecting the resultant solution of fat to extraction with the acid-containing liquid, and utilizing the extract in the process of preparation.

16. A liquid parathyroid gland extract which contains an active principle or hormone having the property of retarding or inhibiting tissue growth but which is substantially free of active principle producing hypercalcaemia, said extract having a pH value of between 4.6 and 5.0, and being of such concentration that, upon injection, it produces noticeable retardation or inhibition of tissue growth.

17. The liquid parathyroid gland extract defined in claim 16, further characterized by the fact that it is free of fatty matter.

NORMAN EVERS.
CYRIL JACK EASTLAND.
JAMES HENRY THOMPSON.